(12) United States Patent
Yu

(10) Patent No.: US 10,313,654 B1
(45) Date of Patent: Jun. 4, 2019

(54) IMAGE PROCESSING METHOD, ELECTRONIC DEVICE, AND NON-TRANSITORY COMPUTER READABLE STORAGE MEDIUM

(71) Applicant: HTC Corporation, Taoyuan (TW)

(72) Inventor: Wen-Hsiang Yu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/925,738

(22) Filed: Mar. 19, 2018

(51) Int. Cl.
| | |
|---|---|
| H04N 13/00 | (2018.01) |
| H04N 7/18 | (2006.01) |
| H04N 13/156 | (2018.01) |
| G06T 7/593 | (2017.01) |
| H04N 5/232 | (2006.01) |
| H04N 13/106 | (2018.01) |
| G06T 7/11 | (2017.01) |

(52) U.S. Cl.
CPC ............ *H04N 13/156* (2018.05); *G06T 7/11* (2017.01); *G06T 7/593* (2017.01); *H04N 5/23258* (2013.01); *H04N 7/181* (2013.01); *H04N 13/158* (2018.05); *G06T 2207/10021* (2013.01); *H04N 2013/0081* (2013.01)

(58) Field of Classification Search
CPC ............... H04N 13/156; H04N 13/158; H04N 5/23258; H04N 2013/0081; H04N 13/122; H04N 13/128; H04N 13/239; H04N 13/243; H04N 7/181; H04N 7/18; G06T 7/11; G06T 7/593; G06T 7/75; G06T 2207/10021; G06T 2207/10012; G06T 19/00; G06T 17/20; G06T 17/00; G06T 15/10; G06T 15/00
USPC ............. 348/42, 46–48, 139, 142, 159, 153; 382/154; 345/419
See application file for complete search history.

(56) References Cited

U.S. PATENT DOCUMENTS

| | | | |
|---|---|---|---|
| 2013/0250382 A1* | 9/2013 | Wiltshire | .................. G03H 1/24 359/23 |
| 2016/0088280 A1* | 3/2016 | Sadi | ..................... H04N 13/254 348/48 |

\* cited by examiner

*Primary Examiner* — Sherrie Hsia
(74) *Attorney, Agent, or Firm* — CKC & Partners Co., LLC

(57) ABSTRACT

An image processing method includes: obtaining, by a first position sensor, a first lens position of a first camera; obtaining, by a second position sensor, a second lens position of a second camera; calculating, by a processing circuit, a relative optical geometry of the first camera and the second camera according to the first lens position and the second lens position; and performing, by the processing circuit, an image switch, an image fusion, or a depth calculation based on the relative optical geometry on the condition that an optical image stabilization is enabled to at least one of the first camera and the second camera.

20 Claims, 6 Drawing Sheets

S4 updating a center coordinate of a region of interest for image and corresponding points matching according to the relative optical geometry of the first camera and the second camera — S44 performing the image switch, the image fusion, or the depth calculation based on the updated center coordinate of the region of interest — S45

Fig. 4B

IMAGE PROCESSING METHOD, ELECTRONIC DEVICE, AND NON-TRANSITORY COMPUTER READABLE STORAGE MEDIUM

BACKGROUND

Technical Field

The present disclosure relates to an electronic device and an image processing method. More particularly, the present disclosure relates to the electronic device and the image processing method related to computer vision.

Description of Related Art

Nowadays, computer vision methods are widely used in various applications. For example, depth calculation may be applied to detect the distance of an object in the image.

SUMMARY

One aspect of the present disclosure is related to an image processing method. In accordance with some embodiments of the present disclosure, the image processing method includes: obtaining, by a first position sensor, a first lens position of a first camera; obtaining, by a second position sensor, a second lens position of a second camera; calculating, by a processing circuit, a relative optical geometry of the first camera and the second camera according to the first lens position and the second lens position; and performing, by the processing circuit, an image switch, an image fusion, or a depth calculation based on the relative optical geometry on the condition that an optical image stabilization is enabled to at least one of the first camera and the second camera.

Another aspect of the present disclosure is related to an electronic device. In accordance with some embodiments of the present disclosure, the electronic device includes a processing circuit, a first camera and a second camera electrically connected to the processing circuit respectively, a first position sensor and a second position sensor electrically connected to the processing circuit respectively, a memory electrically connected to the processing circuit, and one or more programs. The one or more programs are stored in the memory and configured to be executed by the processing circuit, the one or more programs including instructions for: controlling the first position sensor to obtain a first lens position of the first camera; controlling the second position sensor to obtain a second lens position of the second camera; calculating a relative optical geometry of the first camera and the second camera according to the first lens position and the second lens position; and performing an image switch, an image fusion, or a depth calculation based on the relative optical geometry on the condition that an optical image stabilization is enabled to at least one of the first camera and the second camera.

Another aspect of the present disclosure is related to a non-transitory computer readable storage medium. In accordance with some embodiments of the present disclosure, the non-transitory computer readable storage medium stores one or more programs including instructions, which when executed, causes a processing circuit to perform operations including: controlling a first position sensor to obtain a first lens position of a first camera; controlling a second position sensor to obtain a second lens position of a second camera; calculating a relative optical geometry of the first camera and the second camera according to the first lens position and the second lens position; and performing an image switch, an image fusion, or a depth calculation based on the relative optical geometry on the condition that an optical image stabilization is enabled to at least one of the first camera and the second camera.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows:

FIGS. 4A and 4B are detailed flowcharts illustrating the operation in accordance with some embodiments of the present disclosure.

DETAILED DESCRIPTION

Figure 1:
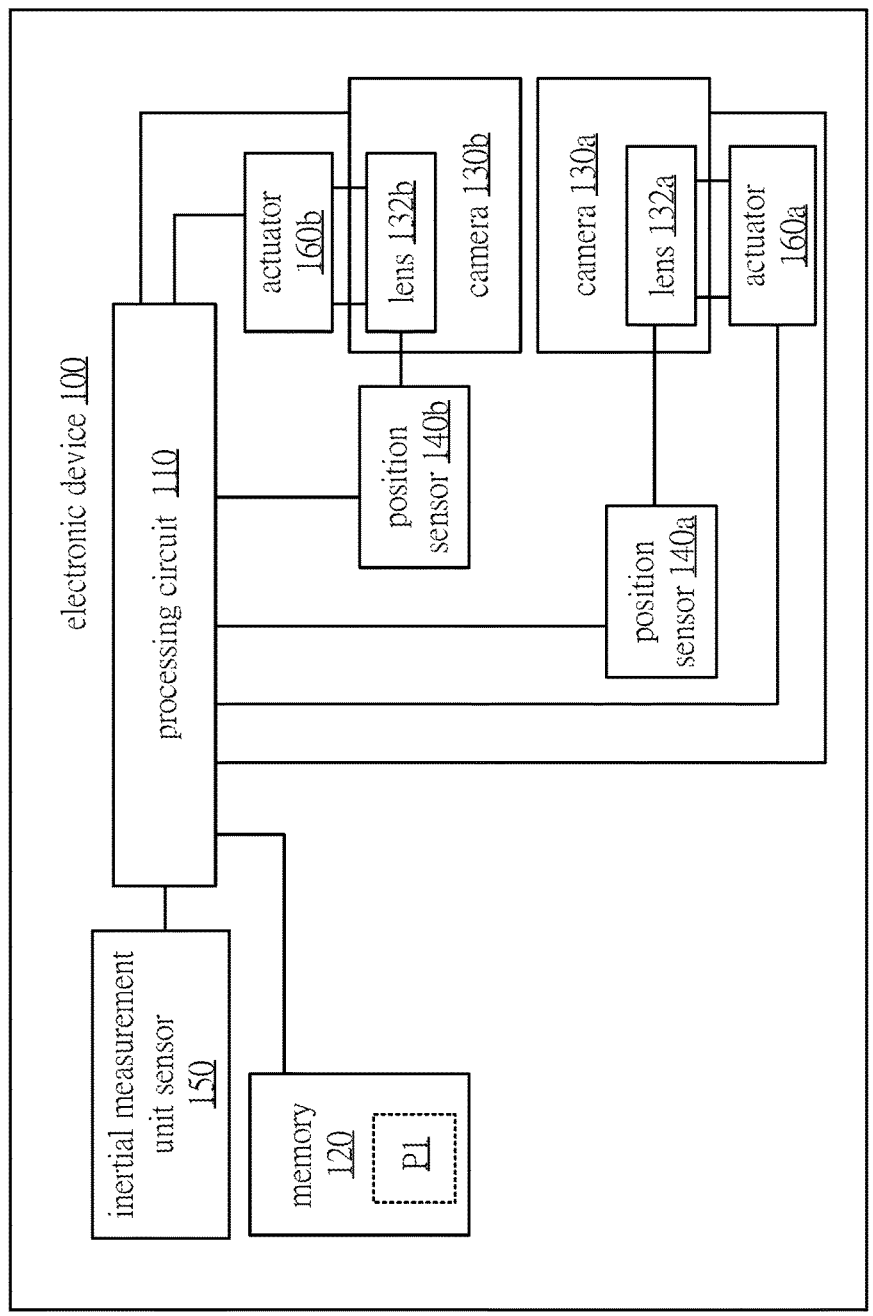
FIG. 1 is a schematic block diagram illustrating an electronic device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is made to FIG. 1. FIG. 1 is a schematic block diagram illustrating an electronic device 100 in accordance with some embodiments of the present disclosure. In some embodiments, the electronic device 100 may be a smartphone, a tablet, a laptop or other electronic devices with multiple built-in digital camera devices. For example, the electronic devices may be a dual-camera or multi-camera device applied in a virtual reality (VR)/mixed reality (MR)/augmented reality (AR) system. Various functions such as image fusion, image switch, or depth calculation may be performed in the electronic device 100 with multiple cameras to provide a better user experience when taking pictures using the cameras or interacting with virtual reality contents. For example, the electronic device 100 may be realized by, a standalone head mounted device (HMD) or VIVE HMD. In detail, the standalone HMD may handle such as processing location data of position and rotation, graph processing or others data calculation.

Specifically, the electronic device 100 may be configured to capture a plurality images with different cameras respectively, and perform a depth calculation to the images to obtain 3D information, that is, the depth information of the images. Accordingly, various image processes may be performed according to the depth information of the objects and/or pixels in the images.

As shown in FIG. 1, the electronic device 100 includes a processing circuit 110, a memory 120, cameras 130a and 130b, position sensors 140a and 140b, an inertial measurement unit sensor 150, and actuators 160a and 160b. One or more programs P1 are stored in the memory 120 and configured to be executed by the processing circuit 110, in order to perform the image fusion or the image switch of images captured by different cameras 130a and 130b, or perform the depth calculation using the images captured by different cameras 130a and 130b.

In structural, the memory 120, the cameras 130a and 130b, the position sensors 140a and 140b, the inertial measurement unit sensor 150, and the actuators 160a and 160b are respectively electrically connected to the processing circuit 110.

Specifically, the actuators 160a and 160b are respectively connected to lenses 132a and 132b of the cameras 130a and 130b, in order to move the lens 132a and 132b according to corresponding control signals received from the processing circuit 110. Thus, the relative position of the lenses 132a and 132b to the cameras 130a and 130b may be different during the operation. Variation of the positions of the lenses 132a and 132b may be detected by the position sensors 140a and 140b correspondingly. By controlling the actuator 160a and 160b to adjust the positions of the lenses 132a and 132b, the images taken by the cameras 130a and 130b may be stable under motion, such as hand-shaking, head-shaking, vibration in the vehicle, etc. Accordingly, the Optical Image stabilization (OIS) may be achieved by the cooperation of the processing circuit 110, the inertial measurement unit sensor 150, and the actuators 160a and 160b.

In some embodiments, the processing circuit 110 can be realized by, for example, one or more processors, such as central processors and/or microprocessors, but are not limited in this regard. In some embodiments, the memory 120 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

Figure 2:
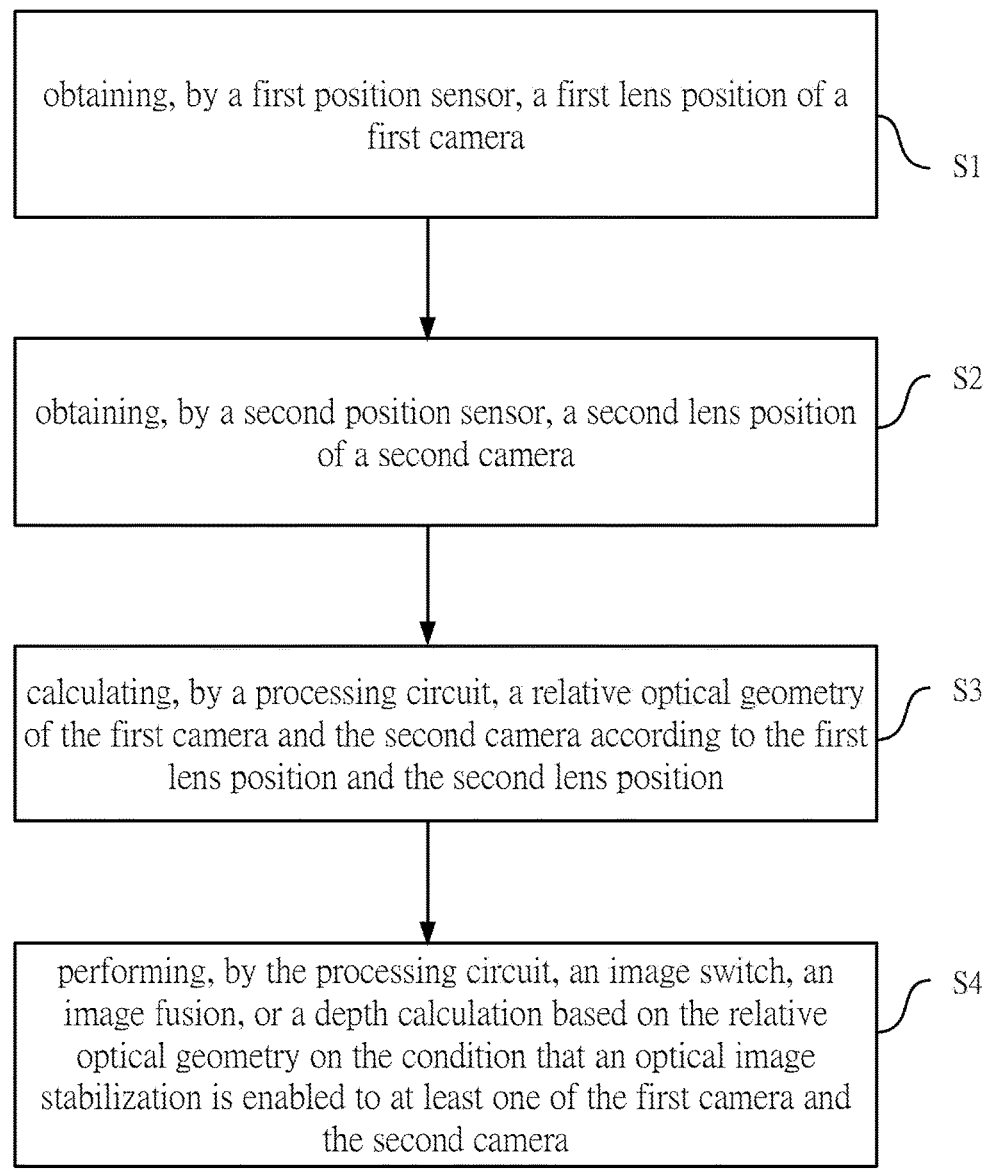
FIG. 2 is a flowchart illustrating an image processing method in accordance with some embodiments of the present disclosure.

For better understanding of the present disclosure, the detailed operation of the electronic device 100 will be discussed in accompanying with the embodiments shown in FIG. 2. FIG. 2 is a flowchart illustrating an image processing method 900 in accordance with some embodiments of the present disclosure. It should be noted that the image processing method 900 can be applied to an electrical device having a structure that is the same as or similar to the structure of the electronic device 100 shown in FIG. 1. To simplify the description below, the embodiments shown in FIG. 1 will be used as an example to describe the image processing method 900 according to some embodiments of the present disclosure. However, the present disclosure is not limited to application to the embodiments shown in FIG. 1.

As shown in FIG. 2, the image processing method 900 includes operations S1, S2, S3, and S4. In operation S1, the processing circuit 110 is configured to control the position sensor 140a to obtain a first lens position of the camera 130a.

In operation S2, the processing circuit 110 is configured to control the position sensor 140b to obtain a second lens position of the camera 130b.

In operation S3, the processing circuit 110 is configured to calculate a relative optical geometry of the cameras 130a and 130b according to the first lens position and the second lens position.

In operation S4, the processing circuit 110 is configured to perform the image switch, the image fusion, or the depth calculation based on the relative optical geometry on the condition that the Optical Image Stabilization is enabled to at least one of the cameras 130a and 130b.

By enabling the Optical Image Stabilization, anti-shake is achieved and thus the quality of the image and/or the video is improved. In addition, the quality of the depth calculation is also improved when the cameras are used in the application of depth calculation. Furthermore, since the lens positions of the cameras 130a and/or 130b are transmitted to the processing circuit 110 by the position sensors 140a and/or 140b, the relative optical geometry of the cameras 130a and 130b may be calculated with the location of the positions of the lenses 132a and 132b taken into account. Alternatively stated, the shift/displacement of the lenses 132a and/or 132b for compensating the external motion and/or shaking is considered in determining the relative optical geometry. Therefore, with the activated OIS, the image switch, the image switch, or the image fusion, or the depth calculation may still keep a high accuracy, and the non-smooth switching/fusion or incorrect depth calculation due to geometrical change between cameras may be prevented.

Figure 3:
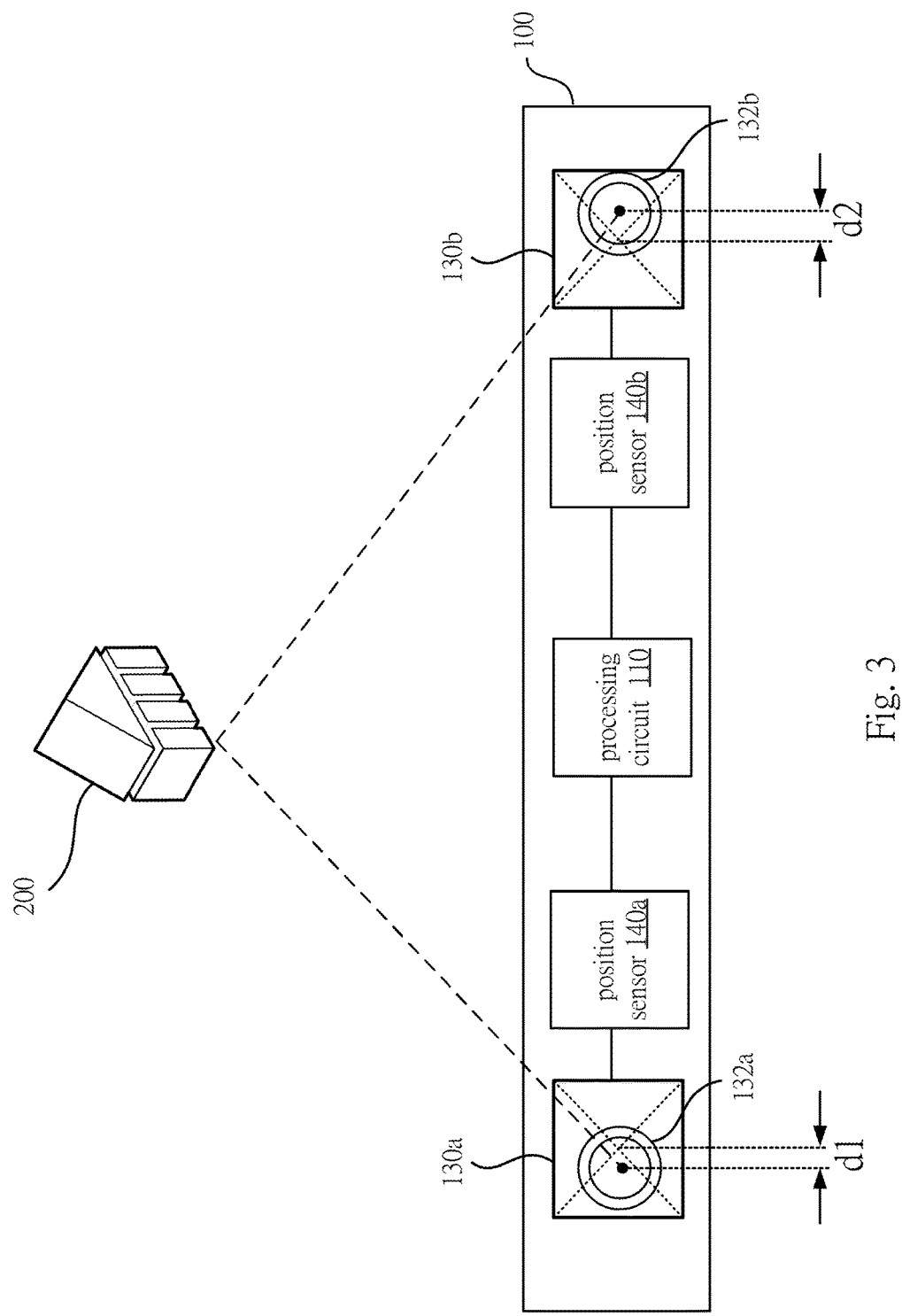
FIG. 3 is a diagram illustrating the operation of the electronic device according to some embodiments of the present disclosure.

Reference is made to FIG. 3. FIG. 3 is a diagram illustrating the operation of the electronic device 100 according to some embodiments of the present disclosure.

As shown in FIG. 3, the camera 130a may be used for capturing a first image of a target object 200 from a first spot. The camera 130b may be used for simultaneously or sequentially capturing a second image of the target object 200 from a second spot.

During the above operation, the Optical Image Stabilization (01S) is enabled to at least one of the cameras 130a and 130b by controlling the movement of the corresponding actuators 160a and 160b connected to the lens 132a and 132b, in order to reduce blurring or the images taken by the camera 130. That is, in some embodiments, the Optical Image Stabilization is enabled and positions of the lens 132a and 132b may be varied to compensate the undesired shaking.

As shown in FIG. 3, the first lens position indicating the position of the lens 132a may be obtained by the position sensor 140a. Thus, the value of the compensating distance d1 of the lens 132a may be received by the processing circuit 110. Similarly, the second lens position indicating the position of the lens 132b may be obtained by the position sensor 140b. Thus, the value of the compensating distance d2 of the lens 132b may also be received by the processing circuit 110. Specifically, the position sensors 140a and 140b may be implemented by various devices such as Hall sensors, but is not limited thereto.

Thus, the processing circuit 110 may be configured to calculate the relative optical geometry of the cameras 130a and 130b according to the first lens position and the second lens position, in which the compensating distances d1 and d2 are known.

Figure 4A:
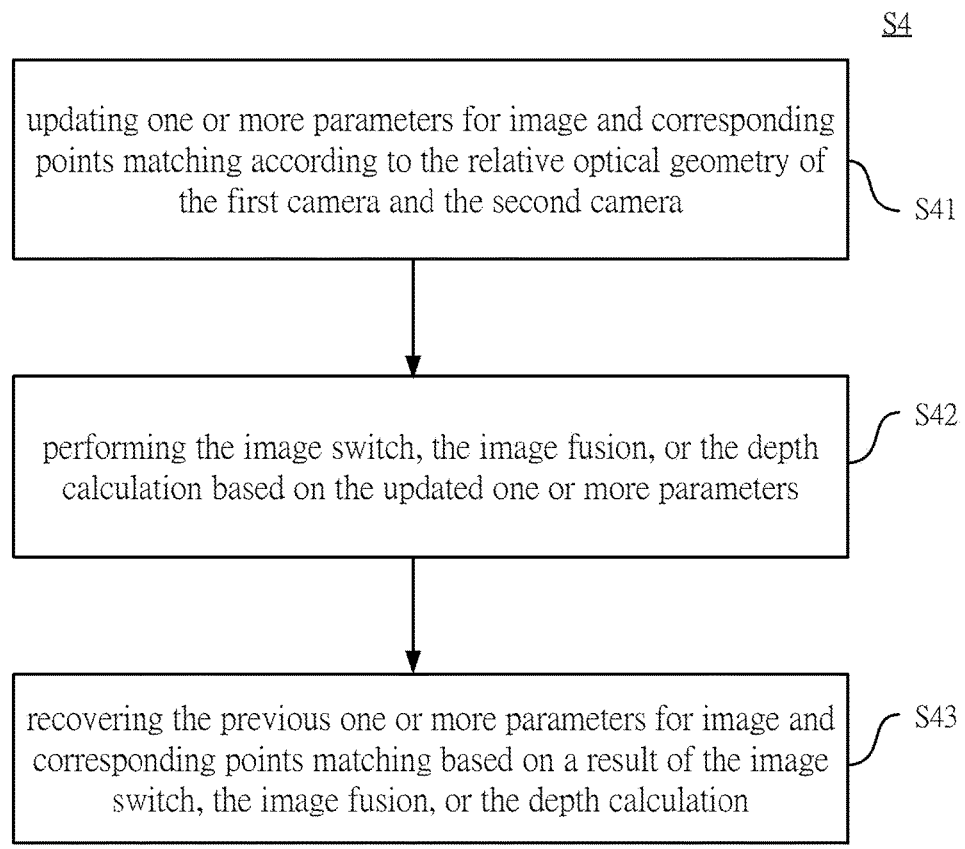

Reference is made to FIGS. 4A and 4B. FIGS. 4A and 4B are detailed flowcharts illustrating the operation S4 in accordance with some embodiments of the present disclosure. As shown in FIG. 4A, in some embodiments, the operation S4 in the image processing method 900 includes operations S41, S42 and S43. The one or more programs P1 stored in the memory 120 may further include instructions for the processing circuit 110 to perform operations S41, S42 and S43 correspondingly.

In operations S41, the processing circuit 110 is configured to update one or more parameters for image and corresponding points matching according to the relative optical geometry of the cameras 130a and 130b.

In operations S42, the processing circuit 110 is configured to perform the image switch, the image fusion, or the depth calculation based on the updated one or more parameters.

Furthermore, in some embodiments, in operations S43, the processing circuit 110 is configured to recover the previous one or more parameters for image and corresponding points matching based on a result of the image switch, the image fusion, or the depth calculation.

Thus, the updated parameter(s) of the processing circuit 110 based on the relative optical geometry of the cameras 130a and 130b may provide a smoother image switching and/or image fusion, or provide a more accurate result for depth calculation. On the other hand, on the condition that the result of the image switch, the image fusion, or the depth calculation is undesired, the previous one or more parameters may be recovered and restored in order to perform the operations with the previous parameter(s) again.

As shown in FIG. 4B, in some embodiments, the operation S4 in the image processing method 900 includes operations S44 and S45. The one or more programs P1 stored in the memory 120 may further include instructions for the processing circuit 110 to perform operations S44 and S45 correspondingly.

In operations S44, the processing circuit 110 is configured to update a center coordinate of a region of interest for image and corresponding points matching according to the relative optical geometry of the cameras 130a and 130b.

In operations S45, the processing circuit 110 is configured to perform the image switch, the image fusion, or the depth calculation based on the updated center coordinate of the region of interest.

Thus, since the region of interest is determined based on the relative optical geometry of the cameras 130a and 130b, the smoother image switching and/or image fusion, or the more accurate result for depth calculation may be guaranteed.

It is noted that, in some embodiments, the operations S41-S43 and the operations S44-S45 may be combined, that is, the parameter(s) in the processing circuit 110 and the region of interest of the images may both be updated in view of the relative optical geometry of the cameras 130a and 130b, in order to achieve a desired result of the image processing.

Figure 5:
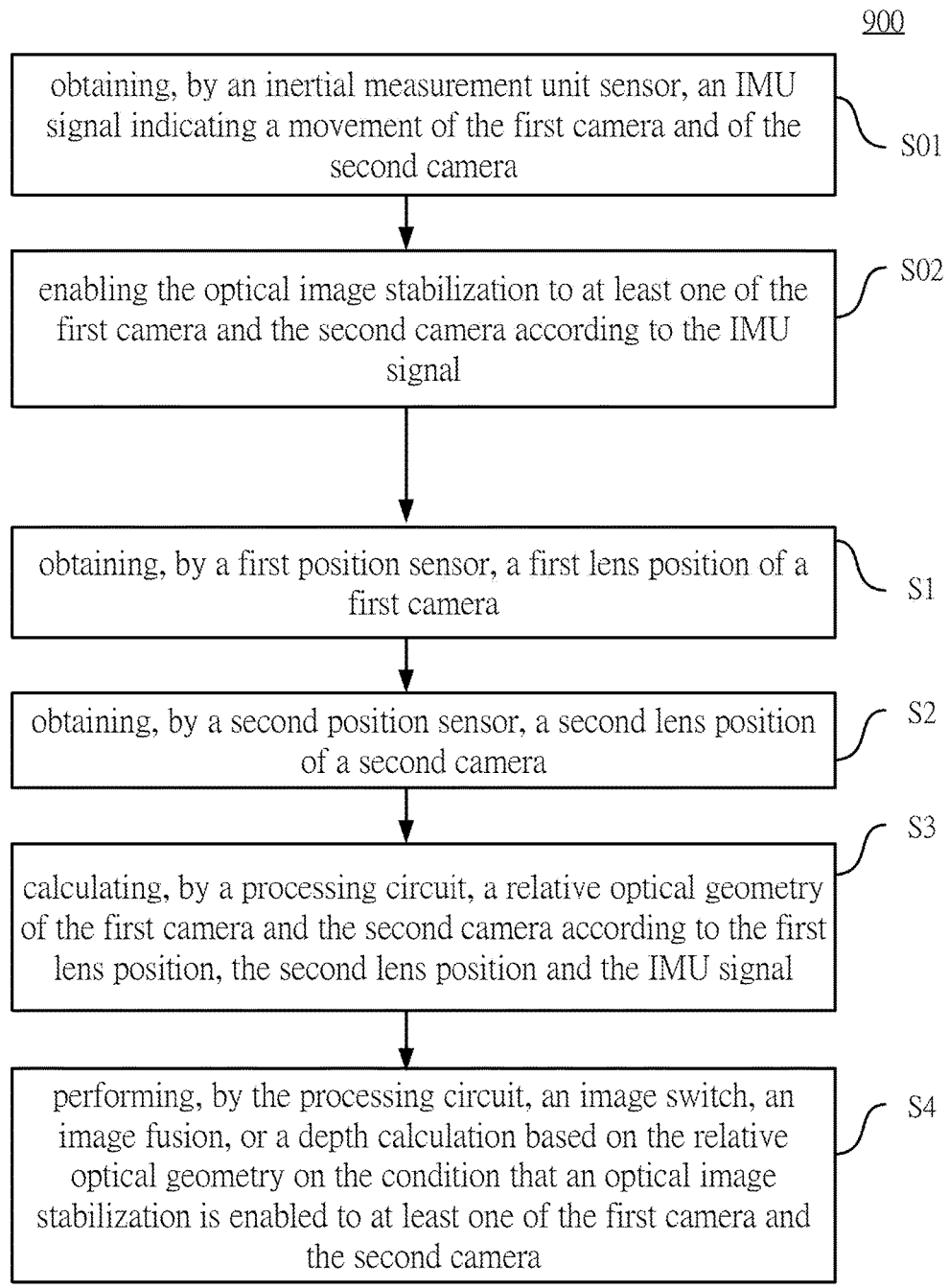
FIG. 5 is a flowchart illustrating the image processing method in accordance with some other embodiments of the present disclosure.

Reference is made to FIG. 5. FIG. 5 is a flowchart illustrating the image processing method 900 in accordance with some other embodiments of the present disclosure. It should be noted that the image processing method 900 can be applied to an electrical device having a structure that is the same as or similar to the structure of the electronic device 100 shown in FIG. 1. To simplify the description below, the embodiments shown in FIG. 1 will be used as an example to describe the image processing method 900 according to some embodiments of the present disclosure. However, the present disclosure is not limited to application to the embodiments shown in FIG. 1.

Compared to the embodiments shown in FIG. 2, in the embodiments shown in FIG. 5, the image processing method 900 further includes operations S01 and S02. The one or more programs P1 stored in the memory 120 may further include instructions for the processing circuit 110 to perform operations S01 and S02 correspondingly. Specifically, the electronic device 100 may achieve the Optical Image Stabilization mentioned above by performing the operations S01 and S02.

First, in the operation 501, the processing circuit 110 is configured to control the inertial measurement unit sensor 150 to obtain an IMU signal indicating a movement of the cameras 130a and 130b.

Next, in operation S02, the processing circuit 110 is configured to enable the optical image stabilization to at least one of the cameras 130a and 130b according to the IMU signal.

For example, in some embodiments, the processing circuit 110 may be configured to control the actuators 160a or 160b to move the corresponding lens 132a or 132b of the corresponding camera 130a or 130b to enable the optical image stabilization, and compensate the undesired shaking/motion by moving lens 132a or 132b in the operation S02.

Thus, the Optical Image Stabilization may be achieved by the co-operation of processing circuit 110, the inertial measurement unit sensor 150 and the actuators 160a or 160b.

In addition, as shown in FIG. 5, in some embodiments, the processing circuit 110 is configured to calculating the relative optical geometry of the cameras 130a and 130b further according to the IMU signal. Alternatively stated, the relative optical geometry of the cameras 130a and 130b may be calculated according to the first lens position, the second lens position, and the IMU signal by the processing circuit 110.

Accordingly, since the inertial measurement unit sensor 150 may output the IMU signal to indicate the movement of the cameras 130a and 130b, a moving distance of the cameras 130a and 130b between different timestamps may be calculated and received by the processing circuit 110. Therefore, when performing the image switching, image fusion, or depth calculation, the motion of the electronic device 100 itself is considered, and thus the non-smoothness or undesired calculation errors may be prevented.

It should be noted that, in some embodiments, the image processing method 900 may be implemented as a computer program. When the computer program is executed by a computer, an electronic device, or the processing circuit 110 in FIG. 1, this executing device performs the image processing method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned image processing method 900, no particular sequence is required unless otherwise specified. Moreover, the operations may also be performed simultaneously or the execution times thereof may at least partially overlap.

Furthermore, the operations of the image processing method 900 may be added to, replaced, and/or eliminated as appropriate, in accordance with various embodiments of the present disclosure.

Through the operations of various embodiments described above, an image processing method is implemented to generate 3D content/depth information for the images captured by two or more cameras of the electronic device, or perform image switching and/or image fusion between the image obtain from different cameras. During the above-mentioned process, the OIS function may be enabled to reduce blurring of the images. Since the lens positions of the cameras and the IMU signal are taken into account together, the accurate result may be calculated and obtained. Accordingly, the quality of the image fusion/switching or the accuracy of the depth information may be improved.

Although the present disclosure has been described in considerable detail with reference to certain embodiments thereof, other embodiments are possible. Therefore, the scope of the appended claims should not be limited to the description of the embodiments contained herein.

What is claimed is:

1. An image processing method comprising:
obtaining, by a first position sensor, a first lens position of a first camera;
obtaining, by a second position sensor, a second lens position of a second camera;
calculating, by a processing circuit, a relative optical geometry of the first camera and the second camera according to the first lens position and the second lens position; and
performing, by the processing circuit, an image switch, an image fusion, or a depth calculation based on the relative optical geometry on the condition that an optical image stabilization is enabled to at least one of the first camera and the second camera.

2. The image processing method of claim 1, further comprising:
obtaining, by an inertial measurement unit sensor, an IMU signal indicating a movement of the first camera and of the second camera; and
calculating, by the processing circuit, the relative optical geometry of the first camera and the second camera further according to the IMU signal.

3. The image processing method of claim 2, further comprising:
enabling the optical image stabilization to at least one of the first camera and the second camera according to the IMU signal.

4. The image processing method of claim 1, further comprising:
updating, by the processing circuit, one or more parameters for image and corresponding points matching according to the relative optical geometry of the first camera and the second camera; and
performing, by the processing circuit, the image switch, the image fusion, or the depth calculation based on the updated one or more parameters.

5. The image processing method of claim 4, further comprising:
recovering, by the processing circuit, the previous one or more parameters for image and corresponding points matching based on a result of the image switch, the image fusion, or the depth calculation.

6. The image processing method of claim 1, further comprising:
updating, by the processing circuit, a center coordinate of a region of interest for image and corresponding points matching according to the relative optical geometry of the first camera and the second camera; and
performing, by the processing circuit, the image switch, the image fusion, or the depth calculation based on the updated center coordinate of the region of interest.

7. The image processing method of claim 1, further comprising:
moving, by an actuator connected to the first camera or to the second camera, a lens of the first camera or of the second camera to enable the optical image stabilization.

8. An electronic device, comprising:
a processing circuit;
a first camera and a second camera electrically connected to the processing circuit respectively;
a first position sensor and a second position sensor electrically connected to the processing circuit respectively;
a memory electrically connected to the processing circuit; and
one or more programs, wherein the one or more programs are stored in the memory and configured to be executed by the processing circuit, the one or more programs comprising instructions for:
controlling the first position sensor to obtain a first lens position of the first camera;

controlling the second position sensor to obtain a second lens position of the second camera;

calculating a relative optical geometry of the first camera and the second camera according to the first lens position and the second lens position; and performing an image switch, an image fusion, or a depth calculation based on the relative optical geometry on the condition that an optical image stabilization is enabled to at least one of the first camera and the second camera.

9. The electronic device of claim 8, further comprising an inertial measurement unit sensor electrically connected to the processing circuit, wherein the one or more programs further comprise instructions for:

controlling the inertial measurement unit sensor to obtain an IMU signal indicating a movement of the first camera and of the second camera; and calculating the relative optical geometry of the first camera and the second camera further according to the IMU signal.

10. The electronic device of claim 9, wherein the one or more programs further comprise instructions for:

enabling the optical image stabilization to at least one of the first camera and the second camera according to the IMU signal.

11. The electronic device of claim 8, wherein the one or more programs further comprise instructions for:

updating one or more parameters for image and corresponding points matching according to the relative optical geometry of the first camera and the second camera; and performing the image switch, the image fusion, or the depth calculation based on the updated one or more parameters.

12. The electronic device of claim 11, wherein the one or more programs further comprise instructions for:

recovering the previous one or more parameters for image and corresponding points matching based on a result of the image switch, the image fusion, or the depth calculation.

13. The electronic device of claim 8, wherein the one or more programs further comprise instructions for:

updating a center coordinate of a region of interest for image and corresponding points matching according to the relative optical geometry of the first camera and the second camera; and performing the image switch, the image fusion, or the depth calculation based on the updated center coordinate of the region of interest.

14. The electronic device of claim 8, further comprising:

an actuator connected to the first camera or to the second camera; and wherein the one or more programs further comprise instructions for:

controlling the actuator to move a lens of the first camera or of the second camera to enable the optical image stabilization.

15. A non-transitory computer readable storage medium storing one or more programs, comprising instructions, which when executed, causes a processing circuit to perform operations comprising:

controlling a first position sensor to obtain a first lens position of a first camera;

controlling a second position sensor to obtain a second lens position of a second camera;

calculating a relative optical geometry of the first camera and the second camera according to the first lens position and the second lens position; and performing an image switch, an image fusion, or a depth calculation based on the relative optical geometry on the condition that an optical image stabilization is enabled to at least one of the first camera and the second camera.

16. The non-transitory computer readable storage medium of claim 15, further comprising instructions, which when executed, causes the processing circuit to further perform operations comprising:

controlling an inertial measurement unit sensor to obtain an IMU signal indicating a movement of the first camera and of the second camera; and calculating the relative optical geometry of the first camera and the second camera further according to the IMU signal.

17. The non-transitory computer readable storage medium of claim 16, further comprising instructions, which when executed, causes the processing circuit to further perform operations comprising:

enabling the optical image stabilization to at least one of the first camera and the second camera according to the IMU signal.

18. The non-transitory computer readable storage medium of claim 15, further comprising instructions, which when executed, causes the processing circuit to further perform operations comprising:

updating one or more parameters for image and corresponding points matching according to the relative optical geometry of the first camera and the second camera; and performing the image switch, the image fusion, or the depth calculation based on the updated one or more parameters.

19. The non-transitory computer readable storage medium of claim 18, further comprising instructions, which when executed, causes the processing circuit to further perform operations comprising:

recovering the previous one or more parameters for image and corresponding points matching based on a result of the image switch, the image fusion, or the depth calculation.

20. The non-transitory computer readable storage medium of claim 15, further comprising instructions, which when executed, causes the processing circuit to further perform operations comprising:

updating a center coordinate of a region of interest for image and corresponding points matching according to the relative optical geometry of the first camera and the second camera; and performing the image switch, the image fusion, or the depth calculation based on the updated center coordinate of the region of interest.

* * * * *